United States Patent
Borg (10) Patent No.: US 9,742,963 B2
(45) Date of Patent: Aug. 22, 2017

(54) COLOR RENDERING ON A HUE PLANE

(71) Applicant: Adobe Systems Incorporated, San Jose, CA (US)

(72) Inventor: Lars Uno Borg, Kalaheo, HI (US)

(73) Assignee: Adobe Systems Incorporated, San Jose, CA (US)

( * ) Notice: Subject to any disclaimer, the term of this patent is extended or adjusted under 35 U.S.C. 154(b) by 129 days.

(21) Appl. No.: 14/708,056

(22) Filed: May 8, 2015

(65) Prior Publication Data

US 2016/0328864 A1  Nov. 10, 2016

(51) Int. Cl.
*H04N 1/60* (2006.01)

(52) U.S. Cl.
CPC ......... *H04N 1/6075* (2013.01); *H04N 1/6016* (2013.01)

(58) Field of Classification Search
None
See application file for complete search history.

(56) References Cited

U.S. PATENT DOCUMENTS

| 5,289,295 A | * | 2/1994 | Yumiba | H04N 1/62 358/515 |
| 2009/0185205 A1 | * | 7/2009 | Nakajima | H04N 1/40012 358/1.9 |
| 2012/0020553 A1 | * | 1/2012 | Pettigrew | G06T 11/001 382/164 |

\* cited by examiner

*Primary Examiner* — Kee M Tung
*Assistant Examiner* — Xin Sheng
(74) *Attorney, Agent, or Firm* — Wolfe-SBMC (57) ABSTRACT

In embodiments of color rendering on a hue plane, a color rendering module can receive three channels of color information. The color rendering module converts the three channels of color information to two channels of color information and performs a color rendering operation on the two channels of color information to provide two channels of rendered color information. The color rendering module then converts the two channels of rendered color information back to three channels of rendered color information.

20 Claims, 7 Drawing Sheets

COLOR RENDERING ON A HUE PLANE

BACKGROUND

Visual content is often generated and presented using devices that have different respective dynamic ranges of luminance or intensity. For example, high dynamic range (HDR) cameras often capture visual content over a higher dynamic range than most displays, such as liquid crystal displays (LCDs), are capable of presenting. When presented through these displays, contrast, radiance, and other details of the visual content, are often compromised due to the limited dynamic range of the display.

In order to compensate for this loss in visual quality, tone curves are typically applied to the visual content to preserve the radiance or other details of the visual content at the limited dynamic range. The application of the tone curves, however, shifts the hue characteristics of most colors, resulting in visual content that appears off-color or under-saturated when presented. As such, additional rendering operations are often required to correct the color shift caused by the toning process, which further increases the complexity and resource costs associated with rendering the visual content.

SUMMARY

This Summary introduces features and concepts of color rendering on a hue plane, which is further described below in the Detailed Description and/or shown in the Figures. This Summary should not be considered to describe essential features of the claimed subject matter, nor used to determine or limit the scope of the claimed subject matter.

Color rendering on a hue plane is described. In embodiments, a module rendering color information can receive three channels of color information. The three channels of color information are converted to two channels of color information that have a linear relationship to the three channels. For example, red, green, and blue (RGB) information may be converted to linearly related components (e.g., orthogonal vectors) on a hue plane of a hue-saturation-lightness (HSL) color space. A color rendering operation is performed on the two channels of color information to provide two channels of rendered color information. The two channels of rendered color information are then converted to three channels of rendered color information.

In other embodiments, a module for toning content color can receive RGB values of a color, such as color values for a pixel of visual content. From the RGB values, a hue angle of the color is determined and used to convert the RGB values to components of the color in a hue-based color space, such as a hue plane. A toning operation is then applied to the components of the color in the hue-based color space to provide toned components of the color. The color's toned components can be converted to toned RGB values based on the color's hue angle.

BRIEF DESCRIPTION OF THE DRAWINGS

Embodiments of color rendering on a hue plane are described with reference to the following Figures. The same numbers may be used throughout to reference like features and components that are shown in the Figures.

DETAILED DESCRIPTION

Toning operations are traditionally applied to color information of visual content in a three channel format, such as a red, green, and blue (RGB) format. Although most three channel formats support such operations, the application of toning operations to three channels of color information often compromises hue or saturation values of the visual content. As such, to avoid presenting content that appears off-color or under-saturated, additional rendering operations are typically applied to the visual content to restore the hue values compromised during the toning process.

Embodiments of color rendering on a hue plane are described, which enable color information of visual content to be rendered without altering or distorting hue values of the color information. In an embodiment, three channels of color information are received and converted to two channels of color information of a hue-based color space. These two channels of color information may be orthogonal to each other or linearly related to the three channels of color information. The two channels of color information are then rendered to provide two channels of rendered color information, which are converted from the hue-based color space to three channels of rendered color information. By so doing, the color information can be rendered with minimal hue shift, which may preclude the need for subsequent hue-correcting operations.

While features and concepts of color rendering on a hue plane can be implemented in any number of different devices, systems, networks, environments, and/or configurations, embodiments of color rendering on a hue plane are described in the context of the following example devices, systems, and methods.

Figure 1:
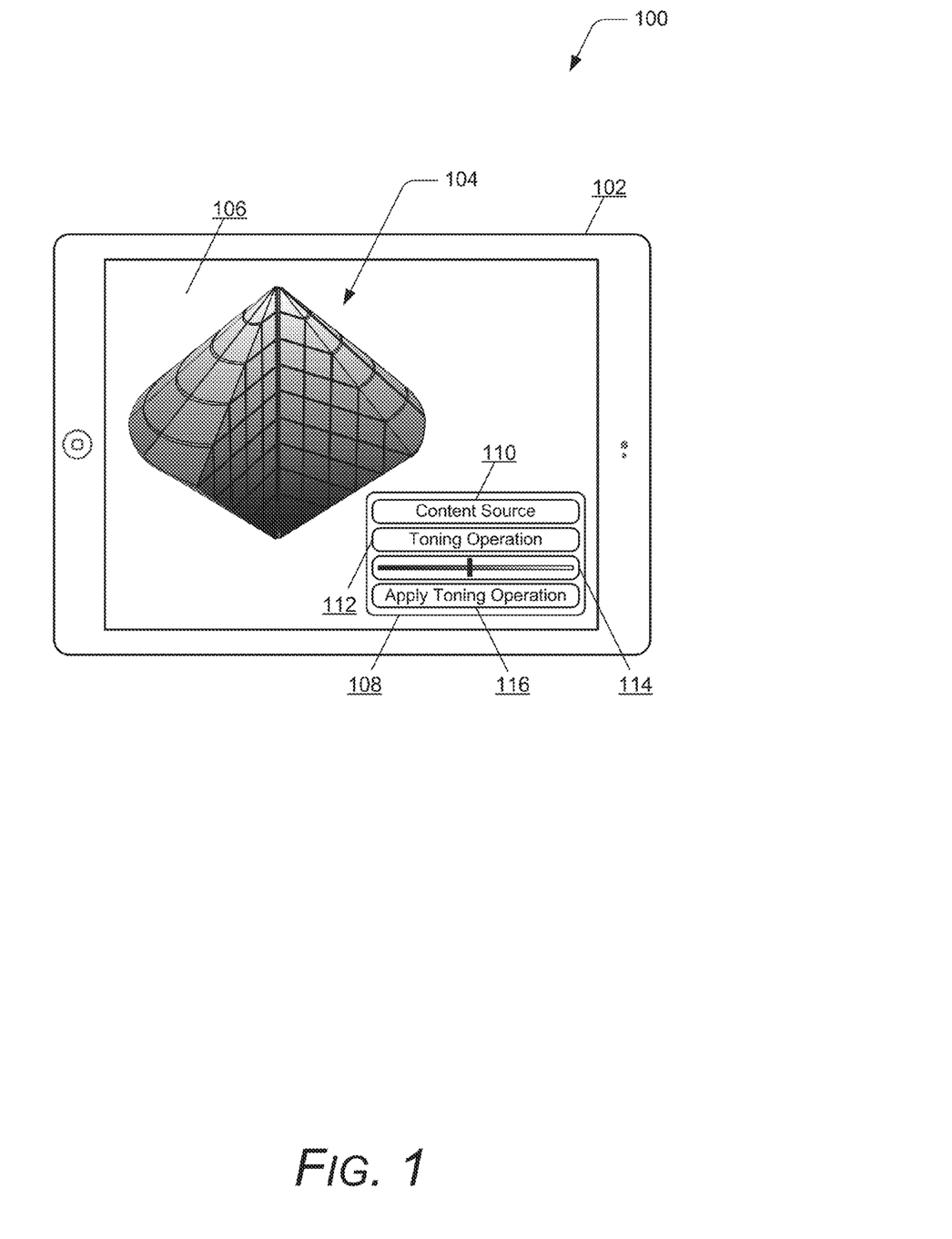
FIG. 1 illustrates an example of color rendering on a hue plane in accordance with one or more embodiments of the techniques described herein.

FIG. 1 illustrates an example 100 of a computing device 102, such as the tablet device shown in this example, in which embodiments of color rendering on a hue plane can be implemented. As detailed in the system description shown in FIG. 2, the computing device 102 can present content views 104, such as images or video, in a user interface 106 of a content-based application. The content views 104 may include views of un-rendered visual content, previews of rendered visual content, or views of rendered content.

In this example, the user interface 106 also includes rendering controls 108, which may enable a user to manage the rendering visual content (also referred to as content) or color information thereof. The rendering controls 108 may be implemented using any suitable user interface element, such as file navigation menus, drop-down menus, text boxes, radio buttons, dials, sliders, and the like. As shown in FIG. 1, the rendering controls 108 include a content source control 110 and a toning operation control 112, which are operable to open respective selection menus for content or toning operations. The rendering controls 108 may also include a tone value control 114 for altering parameters of the toning operation and an application control 116 to initiate the application of the toning operation.

In some embodiments, user interface 106 may include multiple content views 104, such as to present un-rendered visual content, a preview of rendered visual content, or the rendered visual content, respectively. For example, responsive to a user selecting a source of visual content, toning operation, or toning parameters, a preview of the rendered visual content can be presented through a content view 104 of the user interface 106. These are but a few examples of color rendering features that are enabled by the techniques described herein, which are further described with reference to FIGS. 3-6.

Figure 2:
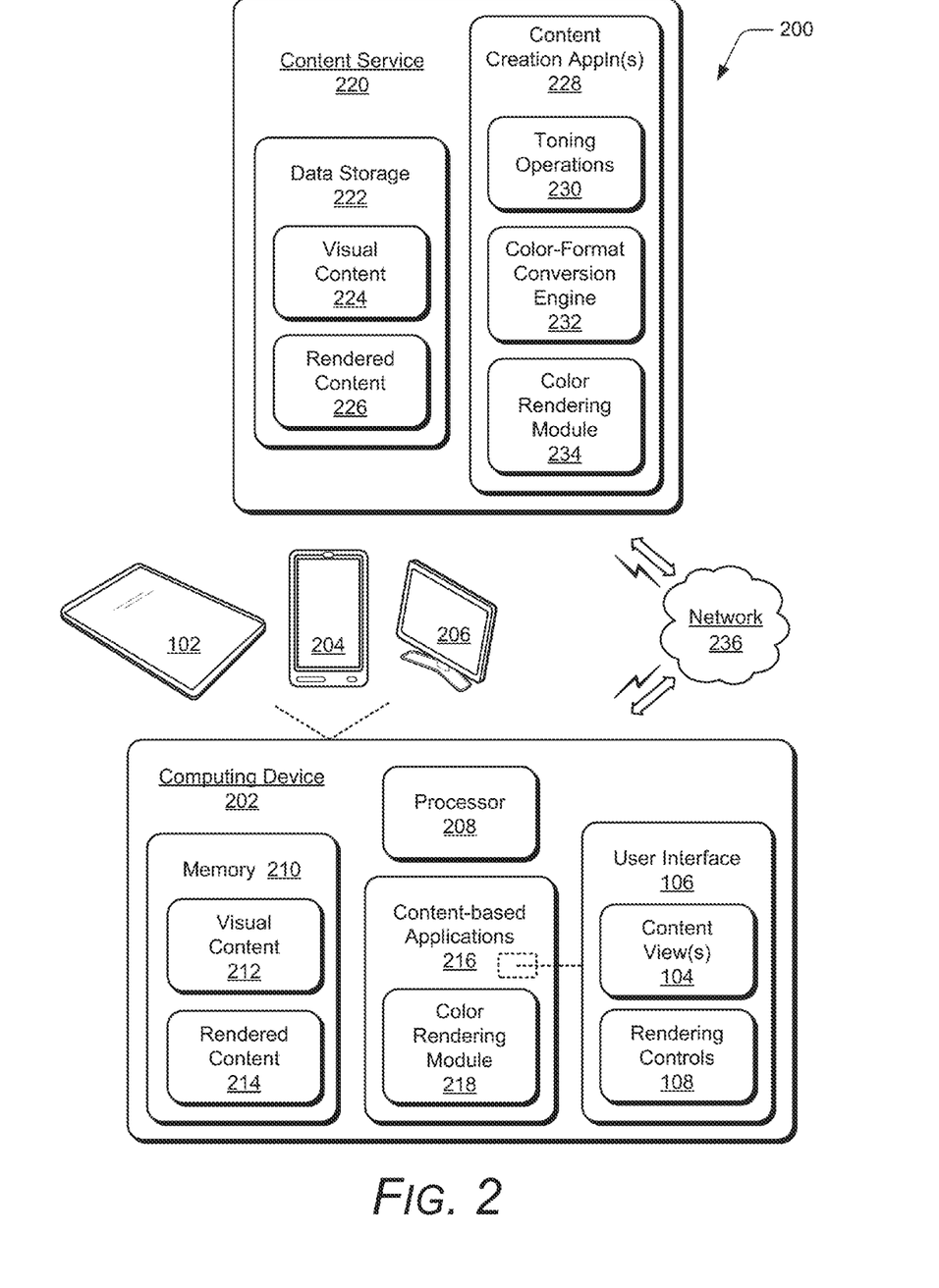
FIG. 2 illustrates an example system in which embodiments of color rendering on a hue plane can be implemented.

FIG. 2 illustrates an example system 200 in which embodiments of color rendering on a hue plane can be implemented. The example system 200 includes a computing device 202, such as the computing device 102 shown in FIG. 1, a mobile phone 204, a display 206 (e.g., television), or any other type of a media capture, media playback, computing, communication, gaming, entertainment, or portable electronic media device. The computing device 202 can be implemented with various components, such as a processor 208 (or processing system) and memory 210, and with any number and combination of differing components as further described with reference to the example device shown in FIG. 7. Although not shown, the computing device 202 also includes a power source, such as a battery, to power the various device components.

The memory 210 of computing device 202 may include any suitable type of memory media or memory devices, such as such as volatile memory, non-volatile memory, random-access memory, storage drives, and the like. The memory 210 maintains data of computing device 202 (not shown), as well as visual content 212 and rendered visual content 214 (also referred to as rendered content 214). The visual content 212 may include any form of static or dynamic graphical content, such as images, bitmaps, videos, and the like. Generally, the visual content 212 includes color information that defines or affects visually-perceived colors of the visual content when presented through a display or printed.

The visual content 212 may include color information that covers or includes of any suitable dynamic range of luminance or color gamut. For example, the visual content 212 can include raw image files or high definition video files that use large bit-depths to represent color or components thereof. In some cases, this bit-depth ranges from 10-bit to 16-bit depth for each color component (e.g., RGB values) of the color information. Alternately or additionally, the visual content 212 may include raw visual content (e.g., minimally processed) provided by an image sensor of a camera, scanner, video camera, or motion picture film scanner.

In embodiments, the rendered content 214 can be provided by rendering the visual content 212, such as through content-based applications 216 of the computing device 202. The rendered content 212 may include rendered color information that covers or includes of a dynamic range or color gamut that is different from that of the visual content 212. For example, the rendered content 214 can include image files or video files that are configured for display or printing via devices having a dynamic range different from a device that captured or generated the visual content 212. In such cases, the rendered content 214 can be rendered to compensate for the difference such that the rendered color information appears, as perceived from a user, correctly when the rendered content 214 displayed or printed.

The content-based applications 216 can be implemented as software or modules, such as executable software instructions (e.g., computer-executable instructions) that are executable with the processor 208 (or with a processing system) to implement embodiments of color rendering on a hue plane. The content-based applications 216 can be stored on computer-readable storage memory (e.g., the device memory 210), such as any suitable memory device or electronic data storage implemented in the computing device. The content-based applications 216 may include applications configured to present, manipulate, generate, publish, design, import, or capture visual content.

In this example, the content-based applications 216 includes a color rendering module 218 implemented as a software module (e.g., computer-executable instructions) on the device. Although shown and described as an integrated module of the content-based applications 216 in this example, the color rendering module 218 may be implemented as an independent module or component on the computing device 202. In at least some embodiments, the color rendering module 218 renders the visual content, such as through a toning operation, to provide the rendered content 214. Ways in which the color rendering module 218 and other entities of FIGS. 1 and 2 may act and interact to provide rendered visual content are set forth in further detail below.

The example system 200 also includes a content service 220, which may be implemented as a cloud-based service or by another device remote to the computing device 202. The content service 220 includes data storage 222 that may be implemented as any suitable memory, memory device, or electronic data storage for network-based data storage. The data storage maintains the content service's visual content 224 and rendered content 218, which may be implemented similar to the visual content 212 and rendered content 214 of the computing device 202, respectively.

The content service 220 can also be implemented with server devices that are representative of one or multiple hardware server devices of the content service. Further, the content service 220 can be implemented with various components, such as a processing system and memory, as well as with any number and combination of differing components as further described with reference to the example device shown in FIG. 7 to implement services, applications, servers, and other features of color rendering on a hue plane. In implementations, the content service 220 implements one or more content creation applications 228, each of which can be implemented as software applications or modules, such as executable software instructions (e.g., computer-executable instructions) that are executable with a processor or processing system of the image service.

The content creation applications 228 can be stored on computer-readable storage memory, such as any suitable memory device or electronic data storage implemented at the image service. Although shown and described as multiple applications, the content creation applications 228 may be implemented as a single application, as multiple software modules, or in other configurations at the cloud-based image service 214, such as on multiple server devices.

The content creation applications 228 can be implemented to import, generate, manipulate, publish, distribute, or produce various forms of visual content. In some cases, the content creation applications 228 are provided as a suite of cloud-based content applications, such as Adobe Creative Cloud™. When accessing or processing the visual content 224, the content creation applications 228 can render the visual content 224 to provide the rendered content 226.

In this particular example, content creation applications 228 include toning operations 230, a color-format conversion engine 232 (also referred to as conversion engine 232), and color rendering module 234 to implement aspects of content rendering. Although not shown, any or all of these components may be implemented by or in conjunction with the color rendering module 218 of the computing device 202. The toning operations 230 may include various tone mapping operators or filters that are applied to visual content, such as tone curves, tone functions, gamma curves, gamma compression ratios, or gamma filtering parameters. For example, toning operations 230 may include tone reproduction curves that enable scene luminance and color to be mapped to print reflectance or display luminance such that, when viewed, the colors of the scene are reproduced with minimal distortions of contrast or saturation.

The conversion engine 232 is implemented to convert color information from one format to another. In some cases, the conversion engine 232 implements a matrix operation to convert RGB color information to corresponding components in a hue-based color space. In at least some aspects, the color rendering module 234 renders color information of visual content to provide rendered color information. Ways in which the color rendering module 234 and other entities of FIGS. 1 and 2 may act and interact to provide rendered visual content are set forth in further detail below.

The example system 200 includes a network 236 and any of the devices, servers, and/or services described herein can communicate via the network, such as for data communication between the computing device 202 and the content service 220. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. For example, the content service 220 can include a content formatting application (e.g., an executable software application) that is implemented to receive data communications from the computing device 202 via the network 236, process and interface the data communications with other content creation applications (e.g., content encoding applications, content streaming applications, etc.), and initiate data communications back to the computing device via the network.

In embodiments, a user of the computing device 202 can select instances of visual content 212 to view through a display associated with computing device 202. In some cases, the color rendering module 218 of computing device 202 renders the instances of visual content 212 and provides corresponding instances of the rendered content 214 for viewing. Alternately or additionally, the instances of the rendered content 214 can be stored to the memory 210 or transmitted to another device. In other cases, the instances of visual content 212 are communicated to content service 220 via network 236 for rendering by the content creation applications 228, which provide corresponding instances of the rendered content 226. The instances of the rendered content 226 at content service 220 are then communicated to the computing device 202 via network 236 to enable the user to view the rendered content.

In other embodiments, a user of the computing device 202 can select to view a stream of the visual content 226 stored by the content service 220. The stream of the visual content 226 is communicated from the content service 220 to the computing device 202 through network 236, which may be configured as content-providing or content distribution network. The color rendering module 218 then renders the stream of the visual content 224 to provide a stream of rendered content, which may be buffered as the rendered content 214 or presented by a display associated with the computing device 202.

Example methods 300 and 600 are described with reference to respective FIGS. 3 and 6 in accordance with one or more embodiments of color rendering on a hue plane. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
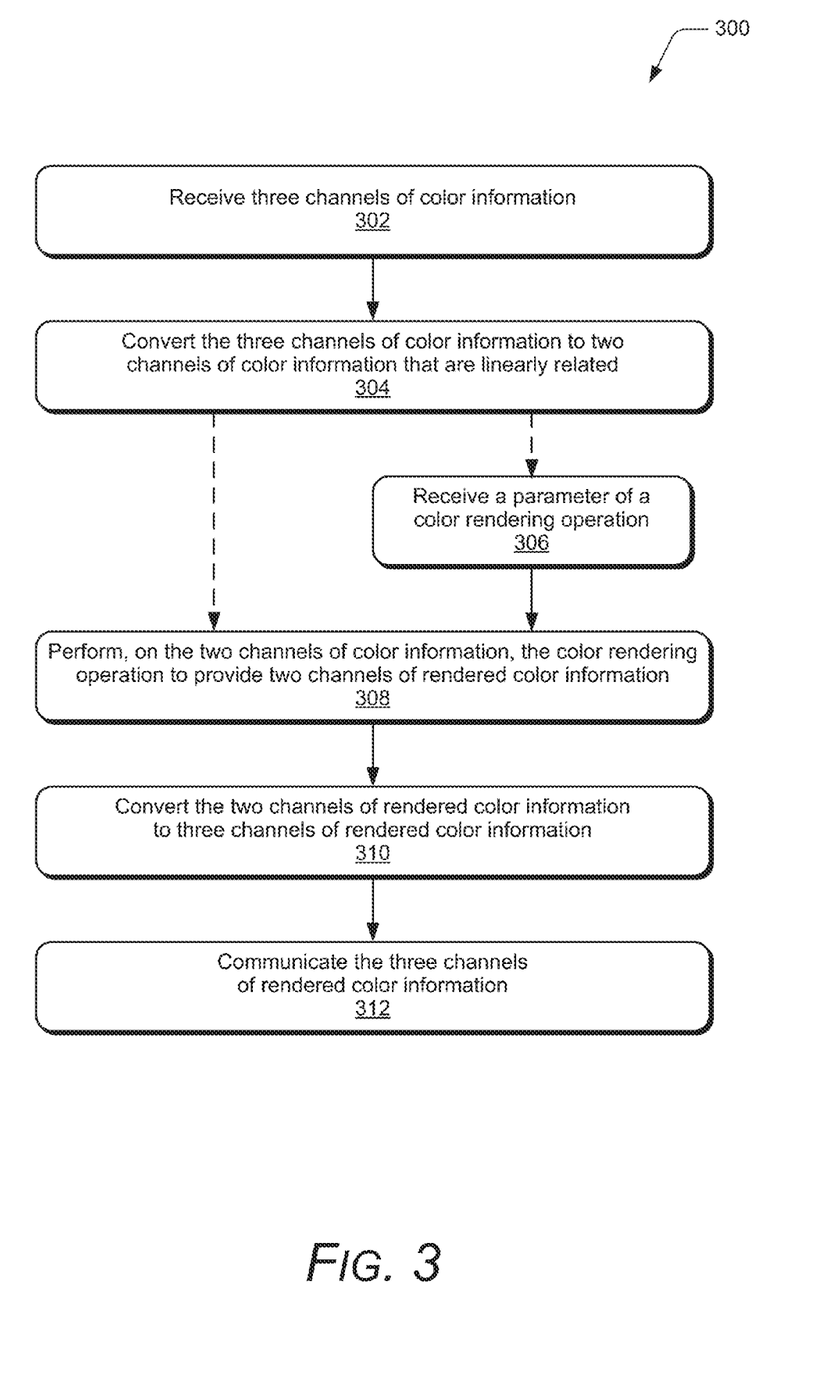
FIG. 3 illustrates example methods of rendering two channels of color information in accordance with one or more embodiments of the techniques described herein.

FIG. 3 illustrates example method(s) 300 of color rendering on a hue plane, and is generally described with reference to either the computing device or the content service shown in the example system of FIG. 2. The order in which the method is described is not intended to be construed as a limitation, and any number or combination of the method operations can be combined in any order to implement a method, or an alternate method.

At 302, three channels of color information are received. The color information may represent a color of any suitable type of visual content, such as an image, photograph, or video frame. In some cases, the three channels of color information are formatted in a red, green, and blue (RGB) format in which each channel, or signal therein, indicates a magnitude of an individual color component. The color information can be received from another entity, such as in response to transmitting a request that requests one or more instances of visual content. Alternately, the color information can be received from a device requesting that the visual content be rendered. For example, the content service 220 receives multiple high dynamic range (HDR) images from the computing device 202 and a request to enable rendering of the multiple images. A user can select the HDR images and initiate the request in the user interface 106 of the content-based application 216, such as through the rendering controls 108 shown in FIG. 1.

At 304, the three channels of color information are converted to two channels of color information. In embodiments, components or signals in the three channels of color information are converted into two linearly related channels of color information. In some cases, the two channels of color information comprise vector components that are linearly related to the color information of the three channel format. In such cases, the vector components may reside or translate into a two-dimensional coordinate system of a hue-based or fixed-hue color space.

Figure 4:
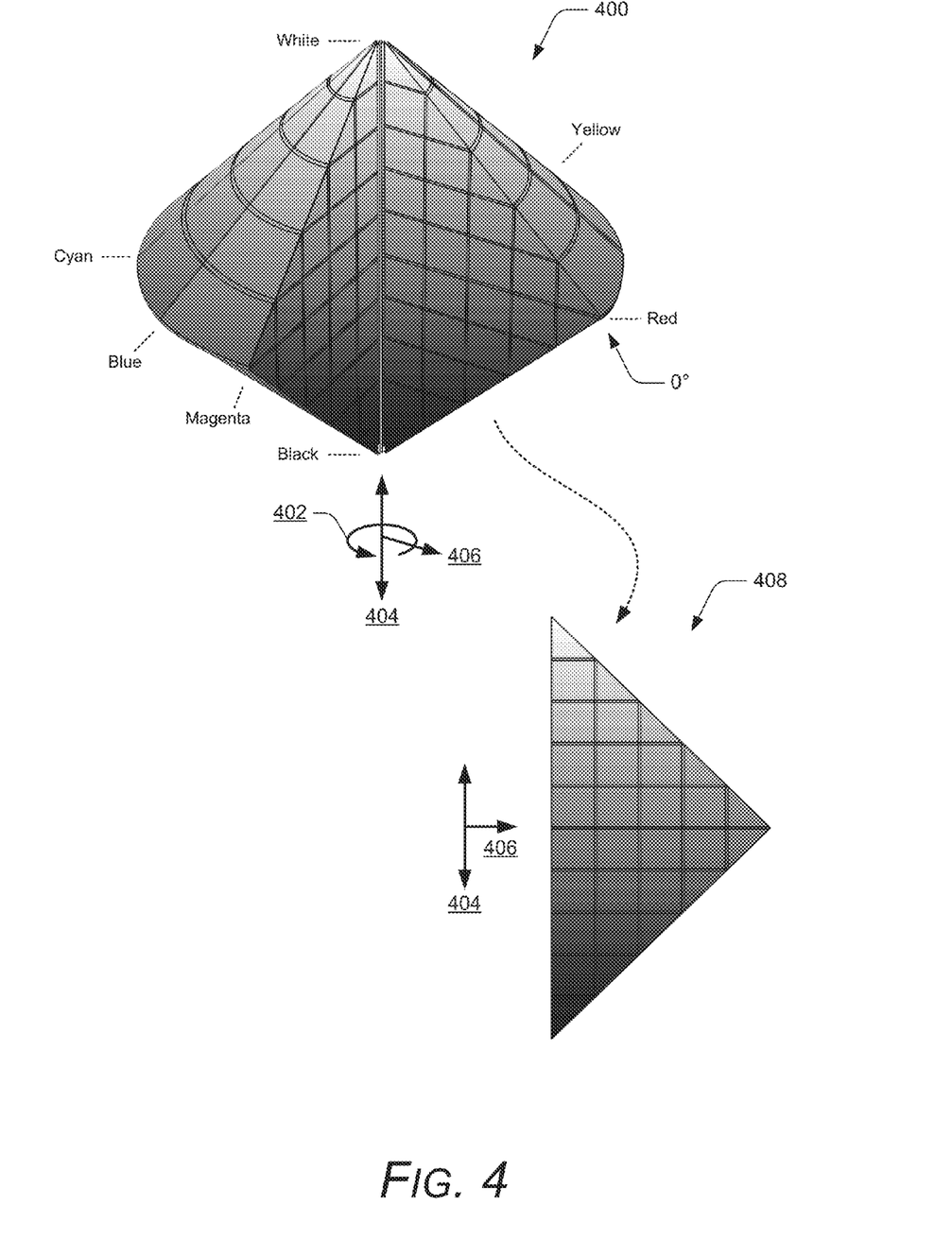
FIG. 4 illustrates an example color space in which embodiments of color rendering can be performed.

By way of example, consider a three-dimensional (3D) color space, such as the hue-saturation-lightness (HSL) color space 400 as shown in FIG. 4. In the HSL color space 400 a hue 402 of a color can be defined as an angular value with respect to a central axis along which a lightness 404 of the color is defined from black (bottom) to white (top). Although shown in greyscale, assume that hue angles of the color space 400 progress from red at 0°, yellow at 60°, green at 120°, cyan at 180°, blue at 240°, and magenta at 300°. Further, a saturation 406 of the color can be defined as a magnitude starting from the central axis and ending at edge of the color space 400 where saturation is maximized at an even lightness value. This is but one example of a 3D color space, others of which may be implemented as hue-saturation-value (HSV), hue-chroma-lightness (HCL), hue-chroma-value (HCV) models of varying geometries (e.g., cylindrical, conical, hexagonal, cubicle, etc.).

In embodiments, the three channels of color information are converted to two channels using a hue angle of the color. Accordingly, a hue angle of the color may be approximated or determined when converting the three channels of color information to the two channels. Continuing the ongoing, assume that the channels of color information includes RGB values of (0.8, 0.5, 0.5) for which the conversion engine 232 of the content service 220 determines a hue angle of 0° (red). A two-dimensional (2D) color space can then be defined for the color based on the approximated or the determined hue color as shown by 2D saturation-lightness (SL) color space 408. Note that in this hue-based or fixed-hue 2D color space, the lightness 404 and hue 406 of the color can be mapped to a corresponding points of the triangular area of 2D SL color space 408.

Once the hue angle is determined, the three channels of color information can be converted to corresponding components in the 2D color space. The corresponding components in the 2D color space may be linearly related to the magnitudes of the color information in the three channel format. In some cases, the components include a major component corresponding to the determined hue angle and a minor component corresponding to an opposing hue angle (e.g., 180° out-of-phase). An example of this is shown in 2D color space 500 of FIG. 5 in which RGB values for black (0, 0, 0) 502, white (1, 1, 1) 504, and red (1, 0, 0) 506 are presented with reference to the 2D color space 500 that has a hue angle of 0°. In the context of the present example, the conversion engine 232 converts the RGB values of (0.8, 0.5, 0.5) into component 508 (red) and component 510 (cyan), which indicate the color's value 512 in the 2D color space 500. Alternatively or in addition, when using an HSL space, the two components 508 and 510 can be L and (1−S)*L where L and S are the S,L components of the HSL space.

In at least some embodiments, the conversion of the three channels of color information to the two channels of color information is performed using a transform or matrix. In some cases, this transform or matrix provides an optimized conversion for color components that correspond to a particular hue angle or value. As such, different matrix values can be determined for, and used to convert, color components that correspond with different respective hue angles or values.

Optionally at 306, a parameter of a color rendering operation are received. The parameter may be received with the color information or received in response to user selection, such as through the rendering controls 108. In some cases the parameter includes a one-dimensional toning curve or gamma curve that is applicable to the color information. Alternately or additionally, the color rendering operation may be received or accessed. Continuing the ongoing example, the content service 220 receives selection of a gamma curve from the user of computing device 202.

Figure 5:
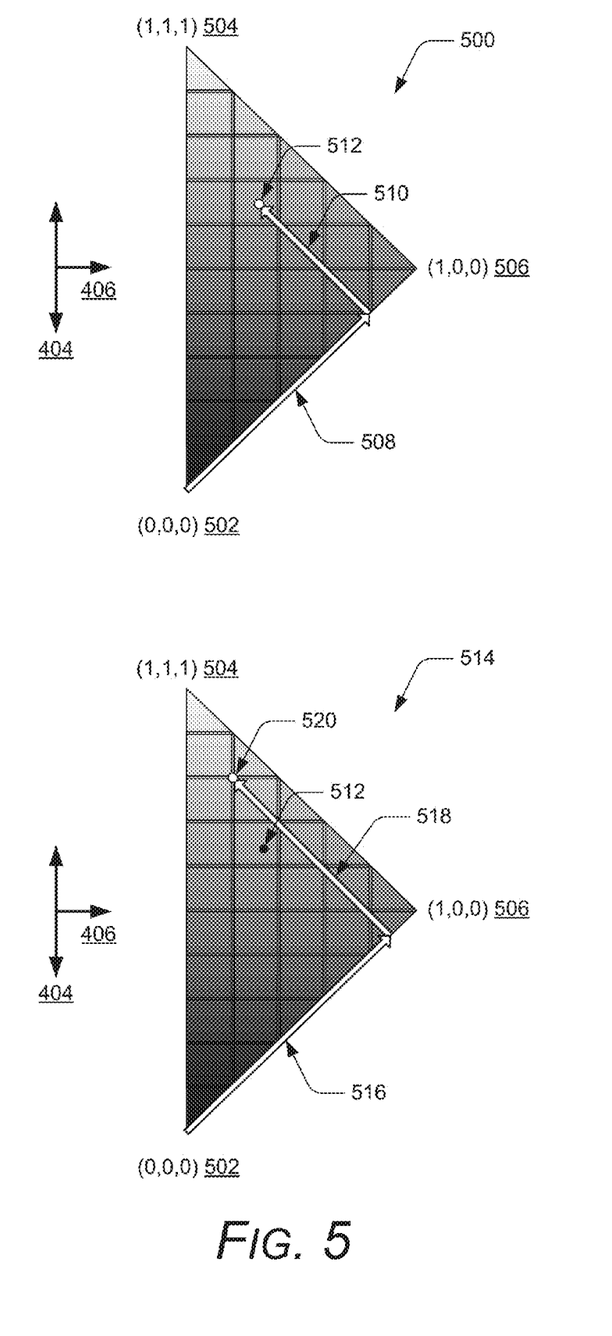
FIG. 5 illustrates an example of a hue plane on which various embodiments of color rendering can be performed.

At 308, the color rendering operation is performed on the two channels of color information. In embodiments, the color rendering operation is performed for each channel or component of the color information to provide rendered color information. Performing the rendering operation on the two channels of the color information maintains or does not affect the hue value of the color during the rendering process. By so doing, the color can be rendered without compromising the hue or saturation of the color, thereby precluding the need for further color-correction operations. In the context of the present example, the rendering module 234 of the content service 220 applies the gamma curve (e.g., square root operation) to the component 508 and component 510. The output of the rendering operation is shown in 2D color space 514, in which rendered component 516 and rendered component 518 indicate a value 520 for the rendered color.

At 310, the two channels of rendered color information are converted to three channels of rendered color information. In embodiments, the two channels of rendered color information are converted to three channels of rendered color information that is linearly related. In some cases, the two channels of rendered color information are converted into the three channels based on the previously determined hue angle. Alternately or additionally, the two channels of rendered color information can be converted into three channels using a matrix or transform operation, such as an inverse of the matrix used in the conversion at operation 304. Continuing the ongoing example, the conversion engine 232 converts rendered component 518 and rendered component 520 into rendered RGB values (0.894, 0.707, 0.707) to provide rendered HDR images into the rendered content 226 of the content service 220. Here, note that the hue angle of the rendered RGB value is the same as the received RGB values, which precludes the need for subsequent hue correcting operations typically associated with tone mapping.

At 312, the three channels of rendered color information are transmitted. In some cases, the rendered color information is transmitted to another module for further processing or rendering. Alternately or additionally the rendered color information can be transmitted to an interface for storage or presentation, such as a display interface. Concluding the present example, the rendered HDR images are transmitted from the content rendering service 220 to the computing device 202, which stores the rendered HDR images into the rendered content 214. From the rendered content 214, the user may display, print, for further manipulate the rendered HDR images.

Figure 6:
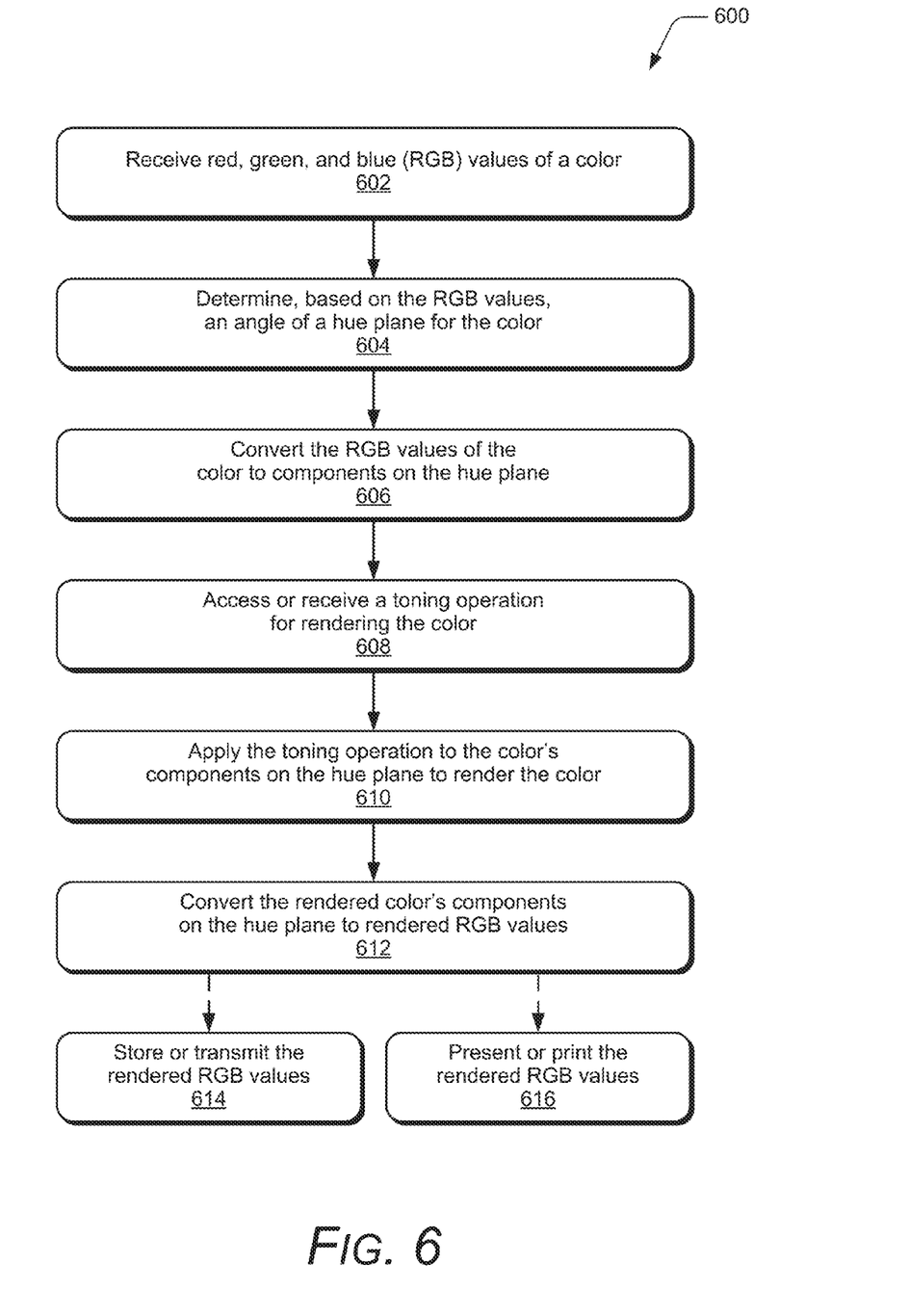
FIG. 6 illustrates example methods of color rendering on a hue plane in accordance with one or more embodiments of the techniques described herein.

FIG. 6 illustrates another example method(s) 600 of color rendering on a hue plane, and is generally described with reference to either the computing device or content service shown in the example system of FIG. 2. The order in which the method is described is not intended to be construed as a limitation, and any number or combination of the method operations can be combined in any order to implement a method, or an alternate method.

At 602, red, green, and blue (RGB) values of a color are received. The RGB values can be access from a local repository or received in response to a request for visual content. The RGB values may represent the color of any suitable type of visual content, such as an image or video frame. In some cases, the image or video frame is formatted as high-dynamic range (HDR) imagery that display or print devices are unable to visually reproduce without tone mapping. By way of example, consider the system 200 of FIG. 2 in which the content service 220 is configured to provide streams of HDR video content. Responsive to a request from the computing device 202, the content service 220 transmits a stream of the HDR video to the computing device. Once received, the computing device 202 can buffer the stream of HDR video, which includes RGB values, into the visual content 210 of the memory 210.

At 604, a hue angle of the color's hue plane is determined based on the RGB values. The hue angle of the color's hue plane can be determined or approximated using any suitable operation, such as a matrix or transform operation. Alternately or additionally, the hue plane can be defined using any suitable hue-based color space, such as HSV or HSL as described above. In the context of the present example, the color rendering module 218 applies a transform operation to a pixel of the video stream to determine a hue angle of 120° for the color (green).

At 606, the RGB values of the color are converted to components on the hue plane. The RGB values can be converted into the components using any suitable operation, such as a matrix or transform. In embodiments, the color's components on the hue plane are orthogonal to each other in the hue-based space and an RGB coordinate space. In other words, the components can be linearly related to the magnitude of the received RGB values. In some cases, the components includes a major component having magnitude in a direction along the hue angle and a minor component having magnitude in a direction along another opposing hue angle (e.g., 180 degrees). Continuing the ongoing example, the color rendering module 218 converts the RGB values into two orthogonal components on a hue plane of 120°.

At 608, a toning operation is accessed or received for rendering the color. In some cases, the toning operation is accessed in response to user selection of a particular toning operation or parameters thereof. In other cases, the toning operation or parameters may be received, such as with the visual content to be rendered. The toning operation may include a variety of toning operations or parameters, such as tone mapping, a tone reproduction curve, tone response curve, gamma compression, gamma curve, and the like. In at least some embodiments the toning operation is a one-dimensional operation that can be applied to one or more channels of information. In the context of the present example, a tone reproduction curve is accessed by color rendering module 218 to render the color of the video stream received from the content service 220.

At 610, the toning operation is applied to the color's components on the hue plane to render the color. In embodiments, the toning operation is applied to each component or signal of the color to provide a rendered color. Applying the toning operation to the color's components on the hue plane maintains the hue value of the color during the rendering process. By so doing, the color can be rendered without compromising the hue of the color, thereby precluding the need for further color-correction operations. Continuing the ongoing example, the color rendering module 218 applies the tone reproduction curve to the components on the 120° hue plane to provide rendered components, which correspond to a tone-mapped color.

At 612, the rendered color's components on the hue plane are converted to rendered RGB values. The rendered RGB values may represent a rendered color that resides in a dynamic range or color gamut that is suitable for display or printing by various devices. In embodiments, the rendered color's RGB values may have less bit-depth than that of the received RGB values. The color's rendered components can be converted into the components using any suitable operation, such as a matrix or transform. In some cases, in inverse of the conversion operation used at operation 606 is applied to convert the components back to an RGB format. In the context of the present example, the color rendering module 218 converts the rendered orthogonal components into rendered RGB values of a standard dynamic range (SDR) video stream, which is presentably by a display operably coupled with the computing device 202. Note that because the rendering of the color occurred in a fixed-hue color space, that the hue of the rendered RGB values is that of the original RGB values, which precludes the need for additional hue correcting operations.

From operation 612, the method 600 may proceed to operation 614 or operation 616. At 614, the rendered RGB values are stored locally or transmitted to another device. The rendered RGB values can be stored or buffered to a local memory for later use, manipulation, or distribution. Alternately or additionally, the rendered RGB values can be transmitted to another device, such as a device requesting rendered content or a device from which visual content was received for rendering.

At 616, the rendered color is presented or printed via the rendered RGB values. The rendered color may reside within a dynamic range or color gamut different from that of the received color. For example, the rendered color can be configured for presentation or printing via a device that has less dynamic range than the device that captured or generated the visual content. Concluding the present example, the color rendering module 218 outputs the rendered RGB values of the SDR video stream to the display associated with the computing device 202.

Figure 7:
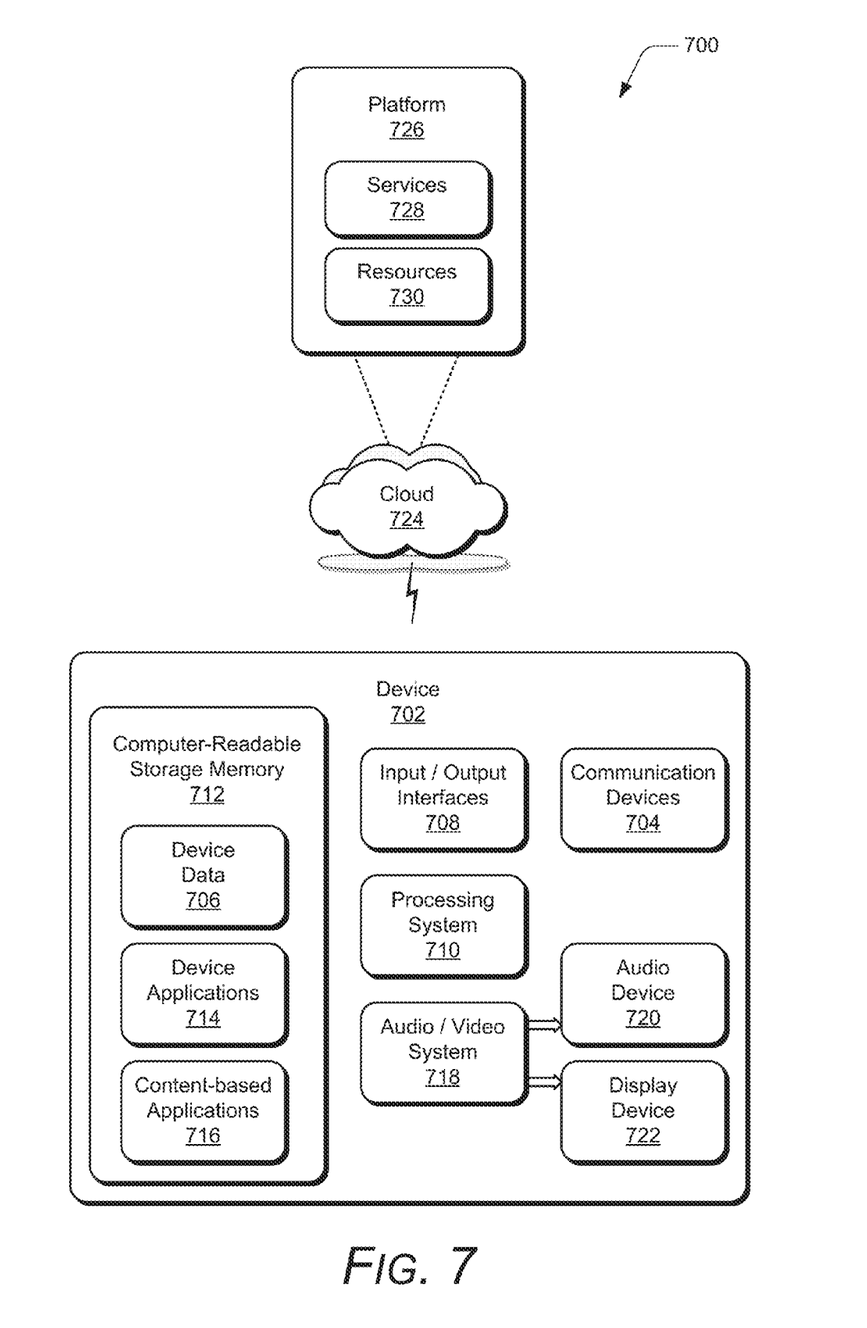
FIG. 7 illustrates an example system with an example device that can implement embodiments of color rendering on a hue plane.

FIG. 7 illustrates an example system 700 that includes an example device 702, which can implement embodiments of color rendering on a hue plane. The example device 702 can be implemented as any of the computing devices and/or services (e.g., server devices) described with reference to the previous FIGS. 1-6, such as any type of computing device, client device, mobile phone, tablet, communication, entertainment, gaming, media playback, set-top box, and/or other type of device. For example, the computing device 102, the computing device 202, and/or the color-rendering service 220 shown in FIGS. 1 and 2 may be implemented as the example device 702.

The device 702 includes communication devices 704 that enable wired and/or wireless communication of device data 706, such as various formats of color information and/or rendered color information of visual content that are transferred from one computing device to another, and/or streamed between multiple computing devices. The device data can include any type of audio, video, and/or image data, such as the content, visual content, or rendered content that is generated by applications or modules executing on the device. The communication devices 704 can also include transceivers for cellular phone communication, satellite communication, fiber optic communication, and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device that may be integrated with device 702. The I/O interfaces also include data input ports via which any type of data, media content, and/or inputs can be received, such as user inputs to the device, as well as any type of audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, a programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage memory 712, such as data storage devices that can be accessed by a computing device, and that provide persistent storage of data and executable instructions (e.g., software applications, modules, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 712 provides storage of the device data 706 and various device applications 714, such as an operating system that is maintained as a software application with the computer-readable storage memory and executed by the processing system 710. In this example, the device applications also include content-based applications 716 that implement embodiments of color rendering on a hue plane, such as when the example device 702 is implemented as the computing device 202 or the content service 220 shown in FIG. 2. Examples of the content-based applications 716 include the content-based applications 212 and color rendering module 218 that are implemented by the computing device 102, and the content creation applications 228 implemented by the content service 220, as described with reference to FIG. 2.

The device 702 also includes an audio and/or video system 718 that generates audio data for an audio device 720 and/or generates display data for a display device 722. The audio device and/or the display device include any devices that process, display, and/or otherwise render audio, video, display, and/or image data. In implementations, the audio device and/or the display device are integrated components of the example device 702. Alternatively, the audio device and/or the display device are external, peripheral components to the example device. In embodiments, at least part of the techniques described for color rendering on a hue plane may be implemented in a distributed system, such as over a "cloud" 724 in a platform 726. The cloud 724 includes and/or is representative of the platform 726 for services 728 and/or resources 730. For example, the services 728 may include the content service 220 described with reference to FIG. 2.

The platform 726 abstracts underlying functionality of hardware, such as server devices (e.g., included in the services 728) and/or software resources (e.g., included as the resources 730), and connects the example device 702 with other devices, servers, etc. The resources 730 may also include applications and/or data that can be utilized while computer processing is executed on servers that are remote from the example device 702. Additionally, the services 728 and/or the resources 730 may facilitate subscriber network services, such as over the Internet, a cellular network, or Wi-Fi network. The platform 726 may also serve to abstract and scale resources to service a demand for the resources 730 that are implemented via the platform, such as in an interconnected device embodiment with functionality distributed throughout the system 700. For example, the functionality may be implemented in part at the example device 702 as well as via the platform 726 that abstracts the functionality of the cloud 724.

Although embodiments of color rendering on a hue plane have been described in language specific to features and/or methods, the appended claims are not necessarily limited to the specific features or methods described. Rather, the specific features and methods are disclosed as example implementations of color rendering on a hue plane, and other equivalent features and methods are intended to be within the scope of the appended claims. Further, various different embodiments are described and it is to be appreciated that each described embodiment can be implemented independently or in connection with one or more other described embodiments.

The invention claimed is:

1. In a digital medium environment to render color information of visual content by at least one computing device, a method comprising:
   receiving, as inputs of an image processing service or video processing service implemented by the at least one computing device, three channels of the color information of the visual content that include red, green, and blue (RGB) channels of the color information;
   determining, by the at least one computing device and based on the RGB channels of the color information, a hue angle for the RGB channels of the color information;
   converting, by the at least one computing device and based on the determined hue angle, the three RGB channels of the color information directly to two channels of color information in a fixed-hue color space that have a linear relationship with the three RGB channels of the color information;
   performing, by the at least one computing device and on the two channels of color information in the fixed-hue color space, a color rendering operation to provide two channels of rendered color information in the fixed-hue color space;
   converting, by the at least one computing device and based on the determined hue angle, the two channels of rendered color information directly to three RGB channels of rendered color information; and
   providing, as outputs of the image processing service or the video processing service implemented by the at least one computing device, the RGB channels of rendered color information.

2. The method as recited in claim 1, wherein the RGB channels of the color information and the RGB channels of rendered color information have a same hue value.

3. The method as recited in claim 1, further comprising receiving one or more parameters associated with the color rendering operation.

4. The method as recited in claim 1, wherein the color rendering operation performed on the two channels of color information is a toning operation.

5. The method as recited in claim 4, wherein the toning operation comprises one of a tone mapping, an application of a tone curve, a gamma compression, a gamma correction, or an application of a gamma curve.

6. The method as recited in claim 1, wherein converting the RGB channels of the color information directly to the two channels of color information in the fixed-hue color space comprises converting the RGB channels of color information directly to two orthogonal components of the color information in the hue-based color space.

7. The method as recited in claim 1, further comprising:
causing, via a display, presentation of the RGB channels of rendered color information;
storing the RGB channels of rendered color information; or
transmitting the RGB channels of rendered color information.

8. The method as recited in claim 1, wherein the two channels of color information in the fixed-hue color space include a first channel or first component that corresponds to the determined hue angle, and include a second channel or second component that corresponds to another hue angle that is approximately 180 degrees out-of-phase with the determined hue angle.

9. The method as recited in claim 1, wherein:
the fixed-hue color space comprises a hue-saturation-luminance (HSL) color space;
a first channel of the two channels of color information in the HSL color space corresponds to a luminance value; and
a second channel of the two channels of color information in the HSL color space corresponds to the luminance value multiplied by a difference of one minus a saturation value.

10. The method as recited in claim 1, wherein at least one respective value of the RGB channels of color information is different from another respective value of the RGB channels of color information.

11. In a digital medium environment to render color information of visual content by at least one computing device, a system comprising:
a hardware-based memory of the computing device configured to maintain the visual content;
a hardware-based processor of the computing device configured to execute a color rendering module of an image processing service or video processing service, the color rendering module implemented to:
receive three channels of color information of the visual content that include red, green, and blue (RGB) channels of the color information;
determine, based on the RGB channels of the color information, a hue angle for the RGB channels of the color information;
convert, based on the determined hue angle, the three RGB channels of the color information directly to two channels of color information in a fixed-hue color space that are linearly related to the three RGB channels of the color information
render the two channels of color information to provide two channels of rendered color information in the fixed-hue color space; and
convert, based on the determined hue angle, the two channels of rendered color information directly to three RGB channels of rendered color information to provide rendered visual content.

12. The system as recited in claim 11, wherein rendering the two channels of color information comprises tone mapping the two channels of color information and the color rendering module is further implemented to receive parameters by which to tone map the two channels of color information in the fixed-hue color space.

13. The system as recited in claim 12, wherein the parameters include one of a tone curve, a tone filtering parameter, a gamma curve, a gamma compression ratio, or a gamma filtering parameter.

14. The system as recited in claim 11, wherein the components of the two channels of color information in the fixed-hue color space are orthogonal to each other.

15. The system as recited in claim 11, wherein the at least one device is implemented as a set-top box, television, display, projector, cloud-based server, digital camera, digital video camera, or content-editing workstation.

16. In a digital medium environment to tone a color of visual content by at least one computing device, a method comprising:
receiving, as inputs of an image processing or video processing service implemented by the at least one computing device, red, green, and blue (RGB) values of the color of the visual content;
determining, by the at least one computing device and based on the RGB values of the color, a hue value of the color of the visual content;
converting, by the at least one computing device and based on the hue value, the RGB values of the color directly into two components of the color in a hue-based color space that are linearly related to the RGB values of the color;
applying, by the at least one computing device, a toning operation to the two components of the color to provide two toned components of the color in the hue-based color space;
converting, based on the hue value and from the hue-based color space, the two toned components of the color directly to toned RGB values of the color; and
providing, as outputs of the image processing service or the video processing service implemented by the at least one computing device, the toned RGB value of the color of the visual content.

17. The method as recited in claim 16, wherein the two components of the color or the two toned components of the color are orthogonal components in the hue-based color space.

18. The method as recited in claim 16, wherein the hue value is a hue angle of the color in a hue-saturation-lightness (HSL) color space and the toning operation is applied to the two components of the color on a hue plane of the HSL color space that corresponds to the determined hue angle.

19. The method as recited in claim 16, further comprising receiving the toning operation or a parameter for the toning operation applied to the two components of the color in the hue-based color space.

20. The method as recited in claim 16, wherein converting the RGB values of the color into the two components of the color in the hue-based color space or converting the two toned components of the color in the hue-based color space directly into the toned RGB values of the color is performed using a matrix operation.

* * * * *

UNITED STATES PATENT AND TRADEMARK OFFICE
CERTIFICATE OF CORRECTION

PATENT NO. : 9,742,963 B2
APPLICATION NO. : 14/708056
DATED : August 22, 2017
INVENTOR(S) : Lars Uno Borg It is certified that error appears in the above-identified patent and that said Letters Patent is hereby corrected as shown below:

In the Claims

Column 13, Line 64, after "color information" insert -- ; --, therefor.

Signed and Sealed this
Thirteenth Day of March, 2018

Andrei Iancu
*Director of the United States Patent and Trademark Office*